United States Patent
Theron

(10) Patent No.: US 11,034,458 B2
(45) Date of Patent: Jun. 15, 2021

(54) FRONT FAIRING OF AN AIRCRAFT PYLON COMPRISING A MOBILE SHROUD AND AIRCRAFT EQUIPPED WITH SAID FRONT FAIRING

(71) Applicant: Airbus Operations S.A.S., Toulouse (FR)

(72) Inventor: Thierry Theron, Colomiers (FR)

(73) Assignee: Airbus Operations S.A.S.

( * ) Notice: Subject to any disclaimer, the term of this patent is extended or adjusted under 35 U.S.C. 154(b) by 288 days.

(21) Appl. No.: 16/293,939

(22) Filed: Mar. 6, 2019

(65) Prior Publication Data

US 2019/0291882 A1  Sep. 26, 2019

(30) Foreign Application Priority Data

Mar. 22, 2018  (FR) ...................................... 18 52459

(51) Int. Cl.
| | |
|---|---|
| *B64D 29/06* | (2006.01) |
| *B64C 7/02* | (2006.01) |
| *B64C 7/00* | (2006.01) |
| *B64D 27/26* | (2006.01) |
| *B64D 29/08* | (2006.01) |

(52) U.S. Cl.
CPC ................ *B64D 29/06* (2013.01); *B64C 7/00* (2013.01); *B64C 7/02* (2013.01); *B64D 27/26* (2013.01); *B64D 29/08* (2013.01); *B64D 2027/264* (2013.01)

(58) Field of Classification Search
CPC .......... B64D 29/06; B64D 29/08; B64C 7/00; B64C 7/02
See application file for complete search history.

(56) References Cited

U.S. PATENT DOCUMENTS

| | | | | |
|---|---|---|---|---|
| 4,037,809 A | * | 7/1977 | Legrand ................. | B64D 27/18 244/54 |
| 4,474,346 A | * | 10/1984 | Murphy ................. | B64D 29/00 244/121 |
| 4,574,325 A | | 3/1986 | Holton | |
| 7,147,185 B2 | | 12/2006 | Beaufort | |
| 8,162,254 B2 | | 4/2012 | Roche | |
| 8,366,039 B2 | | 2/2013 | Porte | |
| 2005/0116093 A1 | * | 6/2005 | Machado ............... | B64D 27/26 244/54 |

(Continued)

FOREIGN PATENT DOCUMENTS

| | | |
|---|---|---|
| EP | 1 535 840 A1 | 6/2005 |
| FR | 2 902 406 A1 | 12/2007 |
| WO | 2008/006826 A1 | 1/2008 |

*Primary Examiner* — Joshua J Michener
*Assistant Examiner* — Arfan Y. Sinaki
(74) *Attorney, Agent, or Firm* — Lerner, David, Littenberg, Krumholz & Mentlik, LLP

(57) ABSTRACT

A front fairing of a pylon of an aircraft includes a shroud, produced in a single piece, which extends over almost all the surface area of the front fairing and which is configured to occupy a closed position in which a peripheral edge of the shroud and a peripheral edge of the front fairing and/or of the nacelle are contiguous, and an open position in which the peripheral edge of the shroud is, at least partially, separated from the peripheral edge of the front fairing and/or of the nacelle. The front fairing includes at least one locking system to hold the shroud in closed position.

7 Claims, 3 Drawing Sheets

(56) References Cited

U.S. PATENT DOCUMENTS

| | | | | |
|---|---|---|---|---|
| 2005/0178889 | A1* | 8/2005 | Machado | B64D 27/26 244/54 |
| 2008/0251634 | A1* | 10/2008 | Bernardi | B64D 27/18 244/54 |
| 2009/0108127 | A1* | 4/2009 | Cazals | B64D 27/26 244/54 |
| 2009/0283631 | A1* | 11/2009 | Roche | B64D 29/08 244/54 |
| 2010/0176250 | A1* | 7/2010 | Porte | B64D 27/18 244/53 B |
| 2011/0127367 | A1 | 6/2011 | Ramlaoui et al. | |
| 2012/0104162 | A1* | 5/2012 | West | B64C 1/1453 244/54 |
| 2015/0251768 | A1* | 9/2015 | Woolley | B64D 27/12 244/54 |

* cited by examiner

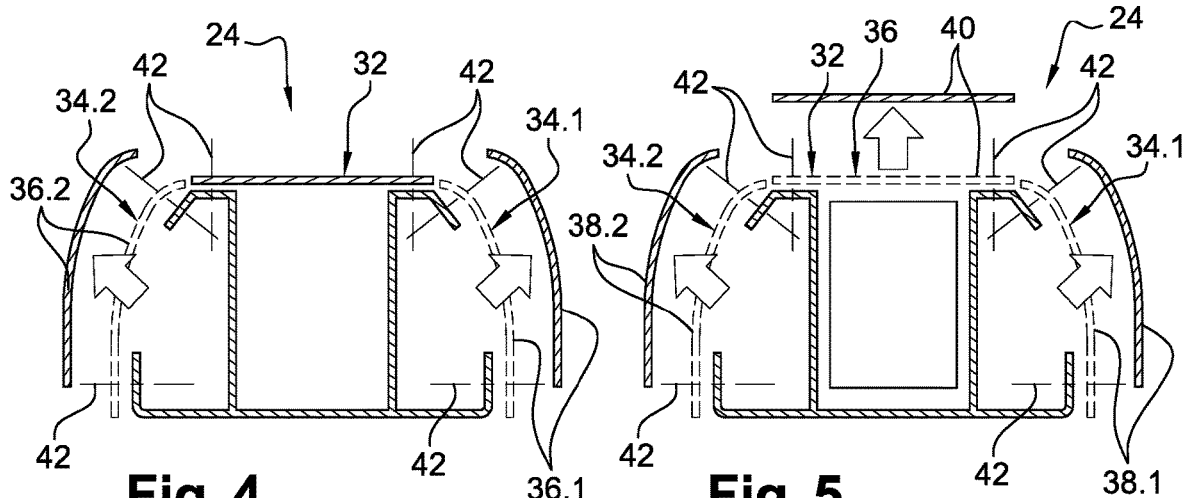
Fig. 4 (PRIOR ART)
Fig. 5 (PRIOR ART)
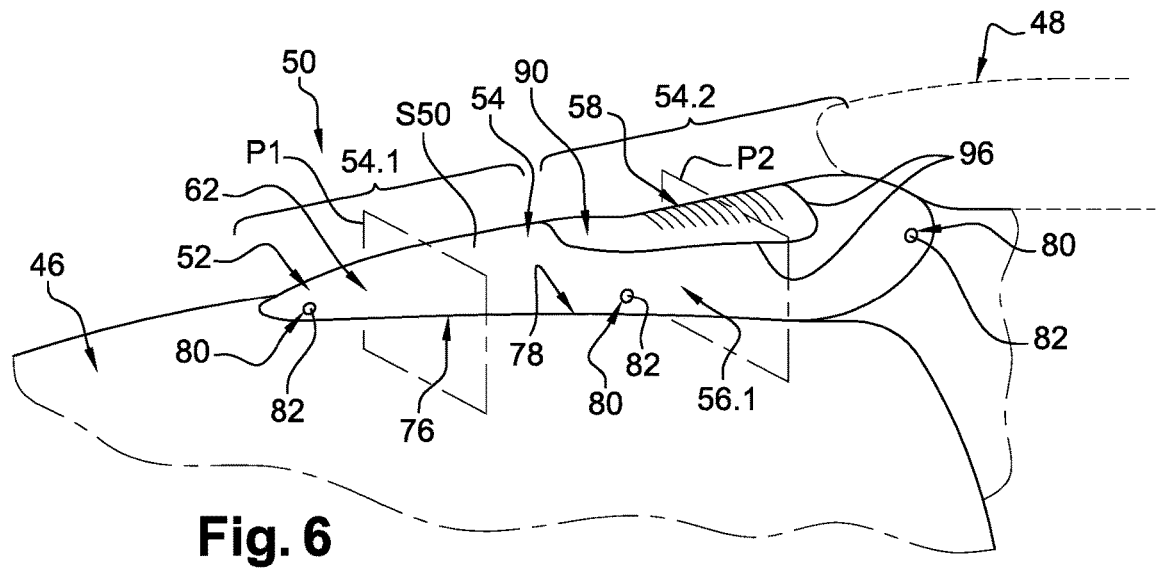
Fig. 6
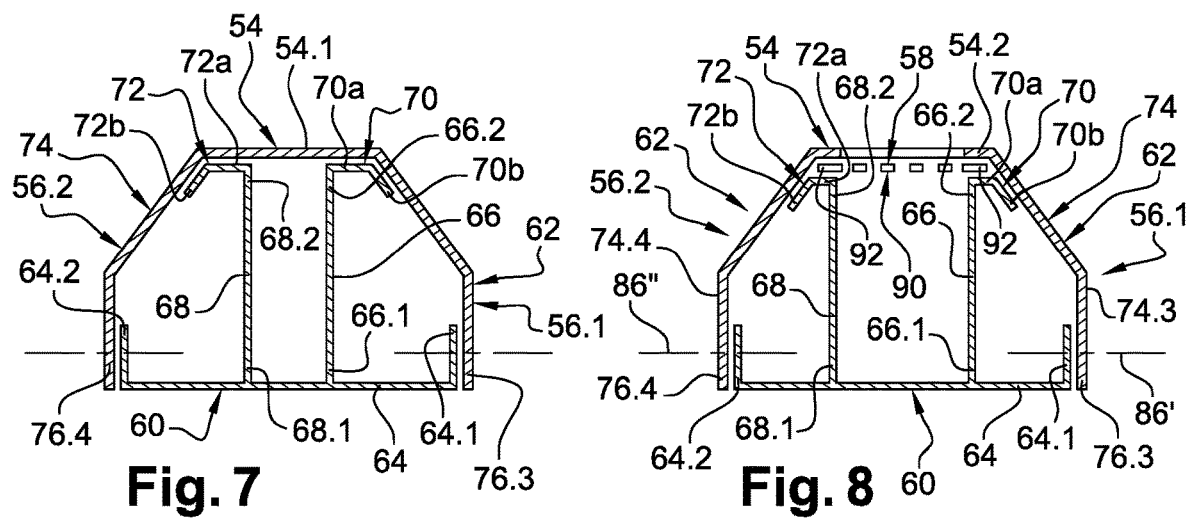
Fig. 7
Fig. 8

FRONT FAIRING OF AN AIRCRAFT PYLON COMPRISING A MOBILE SHROUD AND AIRCRAFT EQUIPPED WITH SAID FRONT FAIRING

The present application relates to a front fairing of an aircraft pylon comprising a mobile shroud and an aircraft equipped with said front fairing.

BACKGROUND OF THE INVENTION

According to one configuration, an aircraft 10 comprises several engine assemblies 12 positioned under the air foil 14.

As illustrated in FIGS. 1 and 2, an engine assembly 12 comprises:

an engine 16 in which a primary air flow circulates, a nacelle 18 positioned around the engine 16 so as to delimit therewith an annular duct in which flows a secondary air flow, and a pylon 20 which ensures the link between the engine 16 and the air foil 14.

The pylon 20 comprises a rigid primary structure, which ensures, among other things, the transmission of the loads between the engine 16 and the air foil 14, and a secondary structure 22 which jackets the primary structure and which limits the drag of the pylon 20.

This secondary structure 22 comprises a front fairing 24, positioned at the front of the air foil 14, a central fairing 26, positioned under the air foil 14 and in line with the nacelle 18, and a rear fairing 28 called bottom rear aerodynamic fairing, or APF (Aft Pylon Fairing), positioned to the rear of the nacelle 18.

For the present application, a longitudinal direction is parallel to the axis of the engine 16.

The terms front and rear refer to the direction of flow of the primary air flow in the engine in operation, the primary air flow entering into the engine at the front and leaving the engine at the rear.

The terms top and bottom refer to a position on a vertical axis, a top element being further away from the ground than a bottom element when the aircraft is on the ground.

According to an embodiment that is visible in FIGS. 3 to 5, the front fairing 24 has an aerodynamic surface which comprises a curved front zone 30, a top zone 32 in the extension of the curved front zone 30 and two left and right lateral zones 34.1, 34.2 arranged on either side on the top zone 32.

The front fairing 24 comprises a plurality of juxtaposed panels, shaped according to the aerodynamic surface of the front fairing 24 and fixed onto a frame, also called substructure. One of these panels, positioned on the top zone 32, more specifically at the rear of the top zone 32, has a ventilation grating 36.

To allow access to the interior of the secondary structure, the front fairing 24 comprises:

a front right mobile panel 36.1 and a rear right mobile panel 38.1 positioned on the right lateral zone 34.1, a front left mobile panel 36.2 and a rear left mobile panel 38.2 positioned on the left lateral zone 34.2, at least one top mobile panel 40 positioned in the top zone 32.

Each of these mobile panels 36.1, 36.2, 38.1, 38.2 and 40 can be totally detached from the rest of the front fairing 24. Thus, each mobile panel 36.1, 36.2, 38.1, 38.2 and 40 is linked to the rest of the front fairing 24 by a plurality of fixings 42 positioned over all the periphery of the mobile panel with a pitch of the order of 10 cm.

Consequently, when an operator wants to access the interior of the front fairing 24, he or she must generally remove all the mobile panels 36.1, 36.2, 38.1, 38.2 and 40 and unscrew more than ten or so fixings 42 (of the order of twenty or so) for each of them. During the intervention, the operator must correctly store each removed mobile panel in order not to damage it. Finally, at the end of his or her intervention, all the fixings 42 must be rescrewed. Thus, the operations of removal and replacement of the mobile panels are relatively lengthy and tedious.

BRIEF SUMMARY OF THE INVENTION

Aspects of the present invention may remedy the drawbacks of the prior art.

An embodiment of the invention is a front fairing of a pylon of an aircraft, having an aerodynamic surface which extends between a nacelle and a wing of the aircraft, at the front of the wing, and which comprises a curved front zone, a top zone in the extension of the curved front zone and two right and left lateral zones arranged on either side of the top zone, said front fairing comprising a frame and a shroud.

According to an embodiment of the invention, the front fairing is characterized in that:

the shroud is a single part, produced in a single piece, in the form of a wall which comprises a front portion, a top portion, a right lateral portion and a left lateral portion shaped respectively as the curved front zone, the top zone and the two right and left lateral zones of the aerodynamic surface of the front fairing, the shroud is configured to occupy a closed position in which a peripheral edge of the shroud and a peripheral edge of the front fairing and/or of the nacelle are contiguous and an open position in which the peripheral edge of the shroud is at least partially separated from the peripheral edge of the front fairing and/or of the nacelle, and the front fairing comprises at least one locking system for holding the shroud in closed position.

The fact that a single part is provided instead of a multitude of panels makes it possible to reduce the number of fixings and therefore the intervention time for accessing the equipment positioned under the front fairing.

Finally, this solution provides better accessibility to the equipment positioned under the front fairing when the shroud is removed.

According to another feature, the top portion of the shroud comprises an opening and the front fairing comprises a top panel, independent of the shroud, secured to the frame, having a ventilation grating, the top panel and the shroud having forms which cooperate so as to ensure a continuity between the shroud and the top panel when the shroud is in closed position.

According to a first embodiment, the shroud is configured to be totally detached from the frame in open position.

According to a second embodiment, the front fairing comprises at least one articulation permanently linking the shroud and the frame, said articulation being configured to pivot the shroud relative to the frame about a pivoting axis between the closed and open positions.

According to one configuration, the pivoting axis is oriented in a horizontal direction, approximately at right angles to a longitudinal direction and/or positioned in proximity to a rear edge of the shroud.

According to another feature, the locking system comprises a plurality of removable fixings linking the shroud and the frame to hold the shroud in the closed position.

Another subject of the invention is an aircraft comprising a front fairing of a pylon according to one of the preceding features.

BRIEF DESCRIPTION OF THE DRAWINGS

Other features and advantages will emerge from the following description of the invention, a description given by way of example only, in light of the attached drawings in which:

FIG. 4 is a schematic cross section along the plane P1 of FIG. 3, FIG. 5 is a schematic cross section along the plane P2 of FIG. 3, FIG. 6 is a perspective view of a front fairing of a secondary structure of an aircraft pylon which illustrates an embodiment of the invention, said front fairing comprising a shroud in closed position, FIG. 7 is a schematic cross section along the plane P1 of FIG. 6, FIG. 8 is a schematic cross section along the plane P2 of FIG. 6.

DETAILED DESCRIPTION

Figure 1:
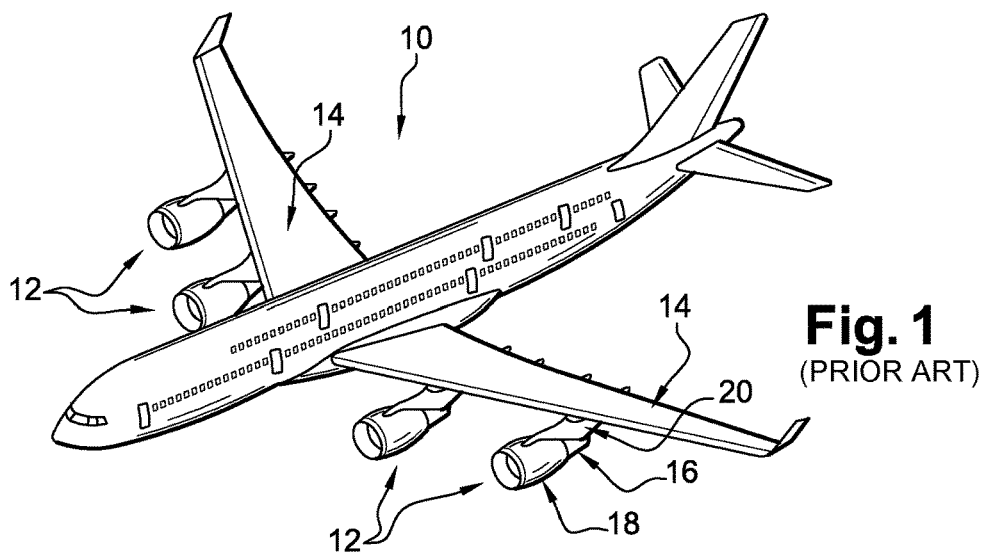
FIG. 1 is a perspective view of an aircraft.
Figure 2:
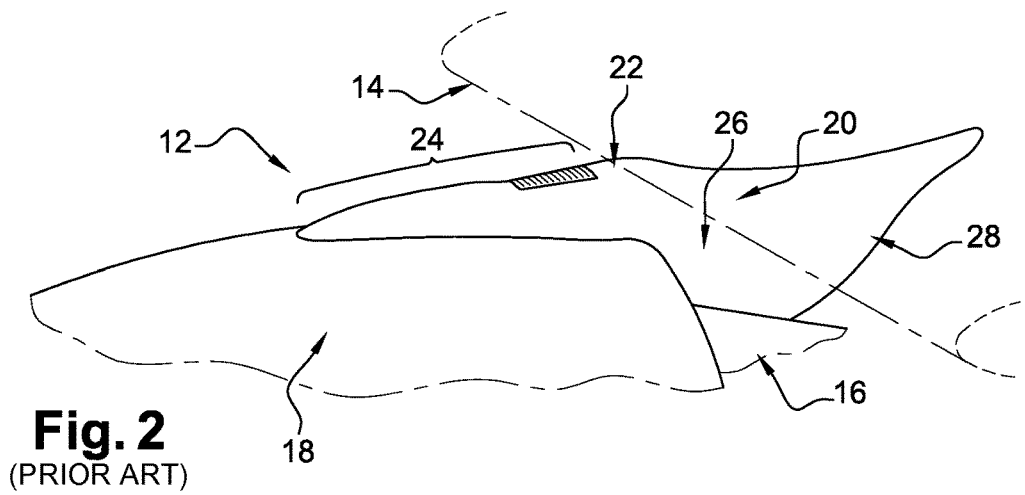
FIG. 2 is a view of a secondary structure of an aircraft pylon which illustrates an embodiment.
Figure 3:
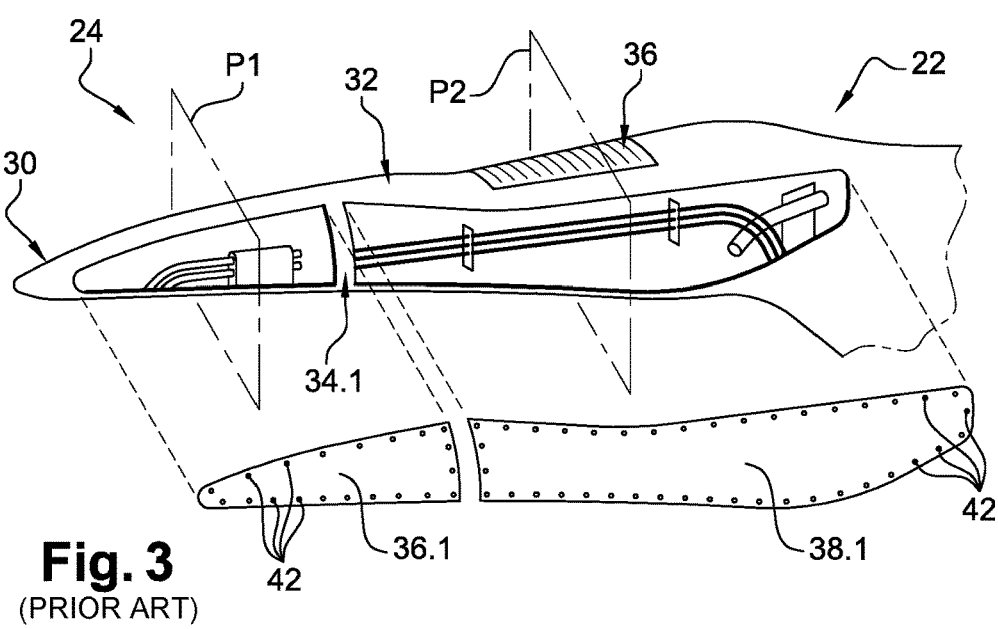
FIG. 3 is a perspective view of a front fairing of a secondary structure of an aircraft pylon which illustrates an embodiment of the prior art.

In FIGS. 6 to 10, a front fairing 50 of a secondary structure of an aircraft pylon is represented.

Geometrically, as illustrated in FIG. 6, the front fairing 50 extends between a nacelle 46 and a wing 48 of the aircraft, in front of the wing 48, and has an aerodynamic surface S50 which comprises a curved front zone 52, a top zone 54 in the extension of the curved front zone 52 and two right and left lateral zones 56.1, 56.2 arranged on either side of the top zone 54.

The top zone 54 comprises a narrow front part 54.1 and a rear part 54.2 that is wider than the front part 54.1, where a ventilation grating 58 is positioned.

Structurally, the front fairing 50 comprises a frame 60 (also called substructure) and a shroud 62 shaped according to the aerodynamic surface S50 of the front fairing 50, said shroud 62 being supported by the frame 60.

According to an embodiment illustrated by FIGS. 7 and 8, the frame 60 comprises:

a substantially horizontal base 64 which extends from the right lateral zone 56.1 to the left lateral zone 56.2 and which has a right flange 64.1 parallel to the right lateral zone 56.1 and a left flange 64.2 parallel to the left lateral zone 56.2, substantially vertical right and left supports 66, 68 which each extend from the base 64 to the top zone 54. Thus, each right or left support 66, 68 comprises a bottom end 66.1, 68.1, linked to the base 64, and a top end 66.2, 68.2 configured to receive the shroud 62.

According to one embodiment, the top end 66.2, 68.2 of the right support 66 (respectively left support 68) comprises a right flange 70 (respectively left flange 72) which has a first right part 70a (respectively left part 72a), parallel to the top zone 54, and a second right part 70b (respectively left part 72b) parallel to the right lateral zone 56.1 (respectively left lateral zone 56.2).

The right flange 64.1 of the base 64 and the second part 70b of the right flange 70 of the right support 66 are spaced apart to allow access to the interior of the front fairing 50. Likewise, the left flange 64.2 of the base 64 and the second part 72b of the left flange 72 of the left support 68 are spaced apart to allow access to the interior of the front fairing 50.

The shroud 62 is a single part, produced in a single piece, in the form of a wall 74 which comprises a front portion 74.1, a top portion 74.2, a right lateral portion 74.3 and a left lateral portion 74.4 (visible in FIG. 8) shaped, respectively as the curved front zone 52, the top zone 54 and the two right and left lateral zones 56.1, 56.2 of the aerodynamic surface S50 of the front fairing 50. The shroud 62 extends over almost all the aerodynamic surface S50 of the front fairing 50 in closed position.

The shroud 62 has a peripheral edge 76 which has a front edge 76.1, a rear edge 76.2, a right lateral edge 76.3 and left lateral edge 76.4 (visible in FIGS. 7 and 8).

Figure 9:
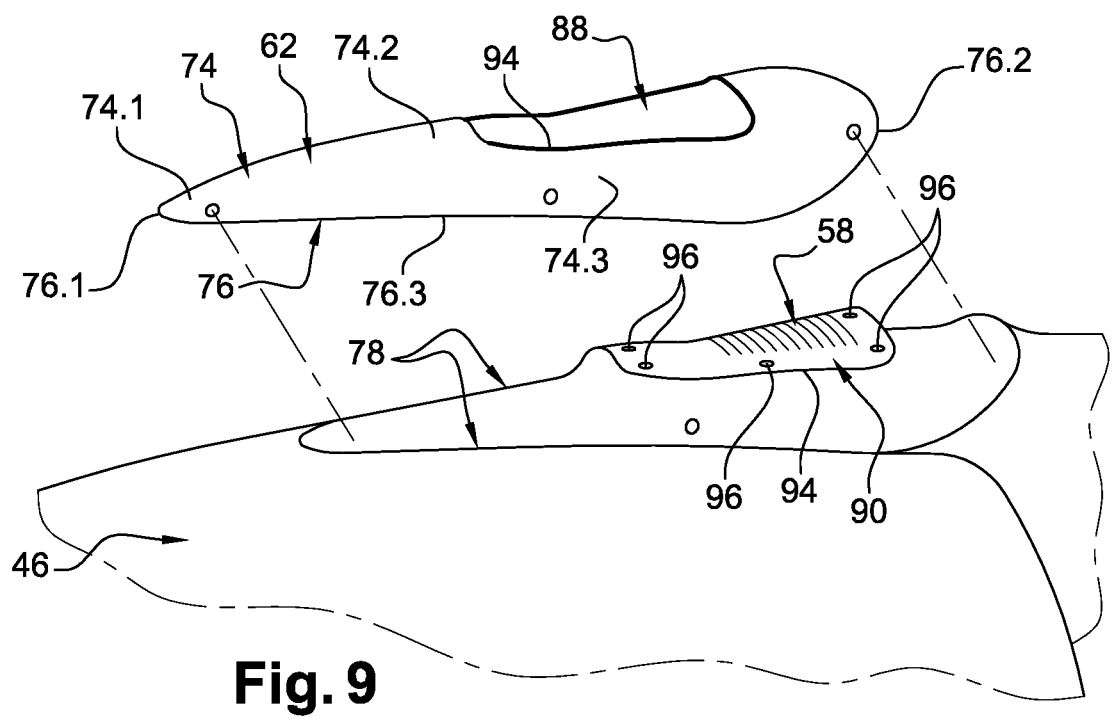
FIG. 9 is a perspective view of the front fairing that can be seen in FIG. 6, its shroud being in open position, which illustrates a first embodiment.
Figure 10:
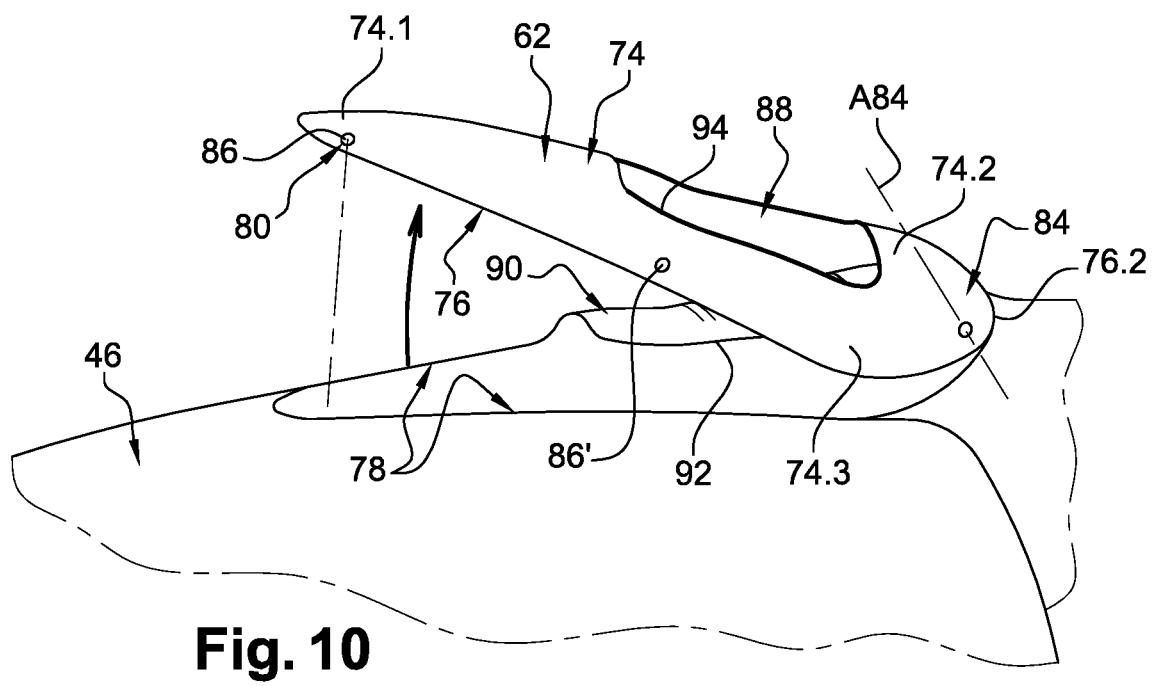
FIG. 10 is a perspective view of the front fairing that can be seen in FIG. 6, its shroud being in open position, which illustrates a second embodiment.

The shroud 62 is configured to occupy a closed position, visible in FIG. 6, in which the peripheral edge 76 of the shroud 62 and a peripheral edge 78 of the front fairing 50 and/or of the nacelle 46 are contiguous, and an open position, visible in FIGS. 9 and 10, in which the peripheral edge 76 of the shroud 62 is, at least partially, separated from the peripheral edge 78 of the front fairing 50 and/or of the nacelle 46, thus allowing access to the interior of the pylon.

In addition to the shroud 62, the front fairing 50 comprises at least one locking system 80 for holding the shroud 62 in closed position.

According to a first embodiment visible in FIG. 9, the shroud 62 is, in open position, totally detached from the frame 60. According to this first variant, in open position, the peripheral edge 76 of the shroud 62 is separated from the peripheral edge of the front fairing 50 and/or of the nacelle 46 over all its length.

According to this first embodiment, the locking system 80 comprises a plurality of removable fixings 82 linking the shroud 62 and the frame 60 to hold the shroud 62 in closed position.

The removable fixings 82 are distributed over the peripheral edge 76 of the shroud 62.

According to a second embodiment visible in FIG. 10, the front fairing 50 comprises at least one articulation 84 permanently linking the shroud 62 and the frame 60, said articulation 84 being configured to pivot the shroud 62 relative to the frame 60 about a pivoting axis A84 between the closed and open positions.

Since the shroud 62 is always linked to the frame 60, even in open position, the risks of loss of the shroud 62 when it is dismantled are eliminated.

According to a configuration, the pivoting axis A84 is oriented in a horizontal direction, approximately at right angles to the longitudinal direction. The pivoting axis A84 is positioned in proximity to the rear edge 76.2 of the shroud 62. Thus, in open position (as illustrated in FIG. 10), the peripheral edge 76 is separated from the peripheral edge 78 of the front fairing 50 and/or of the nacelle 46 over a part of its length (corresponding to the front edge 76.1, to the right and left lateral edges 76.3 and 76.4).

According to this second embodiment, the front fairing 50 comprises two articulations 84 positioned on the rear edge 76.2 of the shroud 62 at the right and left lateral portions 74.3 and 74.4.

According to this second embodiment, the locking system 80 comprises at least one removable fixing 86, linking the shroud 62 and the frame 60, to hold it in closed position.

According to a configuration, the locking system 80 comprises at least one first removable fixing 86 in proximity to the front edge 76.1, at least one second removable fixing 86' in proximity to the right lateral edge 76.3 and at least one third removable fixing 86" (visible in FIG. 8) in proximity to the left lateral edge 76.4. The second and third removable fixings 86' and 86" are positioned approximately equidistant from the front and rear edges 76.1 and 76.2.

According to a configuration, the top portion 74.2 of the shroud 62 comprises an opening 88 in line with the ventilation grating 58.

According to this configuration, the front fairing 50 comprises a top panel 90, independent of the shroud 62, which has the ventilation grating 58 and which is fixed onto the frame 60 by fixings 92.

This top panel 90 has forms cooperating with the opening 88 of the shroud 62 so that when the shroud 62 is in closed position, the peripheral edge 92 of the top panel 90 is covered by the peripheral edge 94 of the opening 88 of the shroud 62 so as to ensure a continuity between the shroud 62 and the top panel 90.

To keep the peripheral edge 94 of the opening 88 of the shroud 62 pressed against the peripheral edge 92 of the top panel 90, the front fairing 50 comprises at least one removable fixing 96 positioned at the peripheral edge 94 of the opening 88 of the shroud 62. Several removable fixings 96 (visible in FIG. 6) can be provided, distributed over the peripheral edge 94 of the opening 88.

According to this configuration, the top panel 90 is still secured to the frame 60 when the shroud 62 is in open position. Thus the duct emerging at the ventilation grating 58 is always blocked by the ventilation grating 58, even when the shroud 62 is in open position.

According to an embodiment, the removable fixings 82, 86, 86', 86" and 96 are screws. However, the invention is not limited to this embodiment. Other solutions can be envisaged for the locking system 80 making it possible to hold the shroud 62 in closed position.

The invention provides the following advantages:

The provision of a single part in place of a multitude of panels makes it possible to improve the aerodynamics.

That also makes it possible to reduce the number of fixings and therefore the intervention time to access the equipment positioned under the front fairing 50.

Finally, this solution provides better accessibility to the equipment positioned under the front fairing 50 when the shroud 62 is removed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front fairing of a pylon of an aircraft, comprising:
an aerodynamic surface extending between a nacelle and a wing of the aircraft, at the front of the wing, the aerodynamic surface comprising a curved front zone, a top zone in an extension of the curved front zone and right and left lateral zones arranged on either side of the top zone, said front fairing comprising a frame and a shroud, the fairing being such that:
the shroud is a single part, produced in a single piece, in the form of a wall comprising a front portion, a top portion, a right lateral portion and a left lateral portion shaped respectively as the curved front zone, the top zone and the right and left lateral zones of the aerodynamic surface of the front fairing;
the shroud is configured to occupy a closed position in which a peripheral edge of the shroud and a peripheral edge of the front fairing and/or of the nacelle are contiguous and an open position in which the peripheral edge of the shroud is at least partially separated from the peripheral edge of the front fairing and/or of the nacelle; and
the front fairing comprises at least one locking system to hold the shroud in closed position,
wherein the top portion of the shroud comprises an opening and the front fairing comprises a top panel, independent of the shroud, secured to the frame, having a ventilation grating, the top panel and the shroud having forms which cooperate so as to ensure a continuity between the shroud and the top panel when the shroud is in closed position.

2. The front fairing of a pylon of an aircraft according to claim 1, wherein the shroud is configured to be totally detached from the frame in open position.

3. The front fairing of a pylon of an aircraft according to claim 1, wherein the front fairing comprises at least one articulation permanently linking the shroud and the frame, said articulation being configured to pivot the shroud relative to the frame about a pivoting axis between the closed and open positions.

4. The front fairing of a pylon of an aircraft according to claim 3, wherein the pivoting axis is oriented in a horizontal direction, approximately at right angles to the longitudinal direction.

5. The front fairing of a pylon of an aircraft according to claim 4, wherein the pivoting axis is positioned in proximity to a rear edge of the shroud.

6. The front fairing of a pylon of an aircraft according to claim 1, wherein the locking system comprises a plurality of removable fixings linking the shroud and the frame to hold the shroud in closed position.

7. An aircraft comprising a front fairing of a pylon according to claim 1.

* * * * *